J. L. WALKER.
AXLE.
APPLICATION FILED OCT. 6, 1911.

1,023,283.

Patented Apr. 16, 1912.

Witnesses

Joseph L. Walker,
Inventor by C. A. Snow & Co.
Attorneys

UNITED STATES PATENT OFFICE.

JOSEPH LEE WALKER, OF BATON ROUGE, LOUISIANA.

AXLE.

1,023,283.  Specification of Letters Patent.  Patented Apr. 16, 1912.

Application filed October 6, 1911. Serial No. 653,234.

*To all whom it may concern:*

Be it known that I, JOSEPH L. WALKER, a citizen of the United States, residing at Baton Rouge, in the parish of East Baton Rouge and State of Louisiana, have invented a new and useful Axle, of which the following is a specification.

It is the object of the present invention to provide an axle and a bearing for a vehicle wheel, so constructed that the possibility of breaking the axle, under an excessive load, will be reduced to a minimum.

A further object of the invention is to provide an axle and a bearing for a vehicle wheel, in which the wear will be distributed evenly throughout the entire circumference of the axle.

A further object of the invention is to provide a novel means for assembling the bearings with the vehicle frame.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
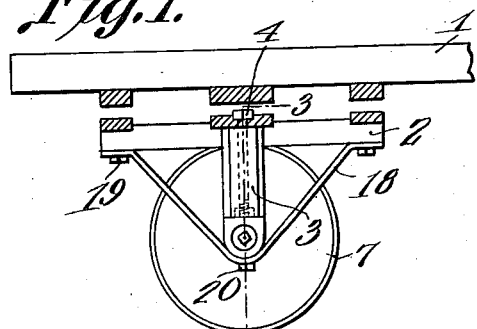
Figure 2:
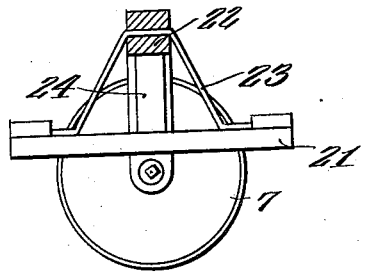
Figure 3:
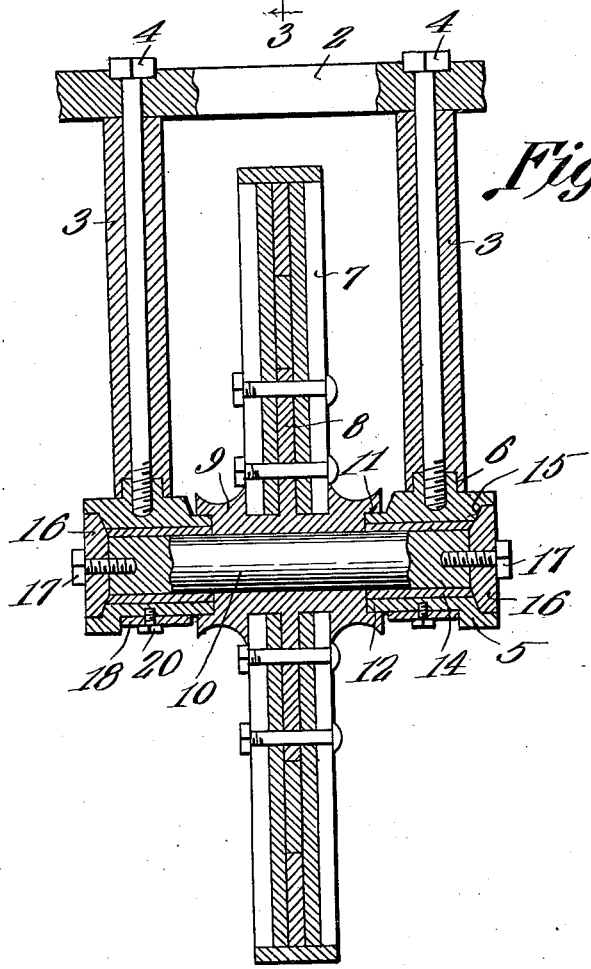
Figure 4:
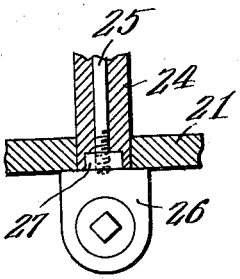

In the accompanying drawings,—Figure 1 shows a portion of a wagon designed for general hauling and farm work, equipped with the device of my invention; Fig. 2 shows a fragment of a log wagon, to which the present invention has been applied; Fig. 3 is a section on the line 3—3 of Fig. 1; and Fig. 4 is a detail enlarged from Fig. 2, parts being sectioned.

In the drawings, the numeral 1 indicates a portion of the platform of a wagon, and the numeral 2 indicates a portion of the frame of the truck. Abutting against the frame 2, and depending therefrom, are tubular standards 3, through which extend bolts 4, the heads of the bolts 4 being engaged with the frame 2, the bolts 4 fitting closely within the standards 3.

The bearings are denoted generally by the numeral 5, each bearing being provided with an upstanding boss 6, and the lower end of the standard 3 being recessed, to receive the boss 6, the lower end of each bolt 4 being threaded into the boss 6, so that the ends of the tubular standards 3 are bound against the under face of the frame 2 and the upper face of the bearing 5.

The wheel is denoted generally by the numeral 7, and may be made of any form. In the present instance, the wheel 7 comprises a web 8 fashioned integrally with a hub 9, through which the axle 10 extends. The wheel 7 may rotate upon the axle 10; preferably, however, the wheel 7 and the axle 10 are secured together for simultaneous rotation.

The ends of the hub 9 are recessed, as shown at 11, to receive the inner ends 12 of the bearings 5. Located within the bearings 5 are bushings 14, preferably fashioned from Babbitt metal, and it is within these bushings that the axle 10 is immediately received. The outer ends of the bearings 5 are recessed, as shown at 15, to receive caps 16, connected with the ends of the axle 10 by means of screws 17 or other attaching elements adapted to a like end.

A pair of arched braces 18 are terminally secured as shown at 19 to the frame 2, the intermediate portions of the braces extending across the bottoms of the bearings 5, the braces 18 and the bearings 5 being united by means of screw bolts 20 or the like.

In Figs. 2 and 4, the numeral 21 denotes a portion of the frame of a log wagon, above which the bolster 22 is located, the bolster 22 being connected with the frame 21 by means of an arched brace 23. The tubular standards are denoted by the numeral 24, and the attaching bolts by the numeral 25, the numeral 26 indicating the bearings and the numeral 27 indicating the bosses upon the bearings. The construction employed in Figs. 2 and 4, is substantially identical with the construction employed in Figs. 1 and 3, saving in so far as the alterations in the frames of the vehicles serve to change the positions of the bearings relative to the frame.

From the foregoing it will be seen that there is no chance of the axle bending under a heavy load, since it is supported upon both sides of the wheel by the bearings 5, which bearings are located in close proximity to the hub 9, thereby permitting the axle 10 to be made relatively short. When the axle 10 is secured to the hub 9, the axle will be worn away throughout its entire circumference; or the bushings 14 will be worn, in either of which events, the bushings may be renewed readily. The caps 16 serve to exclude the dust from the outer ends of the bearings 5, and the coöperation between the hub 9 and the inner ends of the bearings 5 is such that dust cannot readily enter the inner ends of the bearings. In vehicles as commonly constructed, wherein the wheel rotates upon a fixed axle, the axle is worn flat upon one side, whereas, in the present invention, if the axle 10 be secured to the hub 9, as may be done when desired, the wear will take place evenly, around the entire circumference of the axle.

Having thus described the invention, what is claimed is:—

1. In a device of the class described, a frame; a short, separate axle for each wheel; a wheel upon each axle; bearings receiving the ends of each axle; tubular standards abutting against the bearings and against the frame; and members connected with the frame, the members fitting closely within the standards and having threaded portions engaged with the bearings.

2. In a device of the class described, a frame; a short, separate axle for each wheel; a wheel upon each axle; bearings receiving the ends of each axle, the bearings being provided with upstanding bosses; tubular standards surrounding the bosses and abutting against the body portions of the bearings and against the frame; and members extended through the frame and through the tubular standards, said members being threaded for engagement with the bosses.

3. In a device of the class described, a frame; a short, separate axle for the wheel; a wheel secured to each axle; bearings located on both sides of the wheel; bushings located within the bearings and receiving the axle for rotation; closure members removably secured to the ends of the axle and fitting within the bearings; bosses upstanding from the bearings; tubular standards surrounding the bosses and abutting against the bearings and against the frame; and members extended axially through the standards, said members being engaged with the frame, and being threaded into engagement with the bosses.

In testimony that I claim the foregoing as my own, I have hereto affixed my signature in the presence of two witnesses.

JOSEPH LEE WALKER.

Witnesses:
 James C. Dozier,
 Charles V. Porter, Jr.

---

Copies of this patent may be obtained for five cents each, by addressing the "Commissioner of Patents, Washington, D. C."